United States Patent
Mickelsen et al.

(10) Patent No.: US 8,925,033 B2
(45) Date of Patent: Dec. 30, 2014

(54) DELIBERATE COLLISION TRIGGERING IN MULTI-CHANNEL REMOTE CONTROL COMMUNICATION ENVIRONMENTS

(71) Applicant: EchoStar Technologies, LLC, Englewood, CO (US)

(72) Inventors: Jeremy Mickelsen, Denver, CO (US); David Mullins, Boulder, CO (US)

(73) Assignee: EchoStar Technologies L.L.C., Englewood, CO (US)

( * ) Notice: Subject to any disclaimer, the term of this patent is extended or adjusted under 35 U.S.C. 154(b) by 0 days.

(21) Appl. No.: 13/786,893

(22) Filed: Mar. 6, 2013

(65) Prior Publication Data

US 2014/0176808 A1    Jun. 26, 2014

Related U.S. Application Data

(60) Provisional application No. 61/740,953, filed on Dec. 21, 2012.

(51) Int. Cl.
*H04N 7/16* (2011.01)
*H04N 5/44* (2011.01)
*G08C 23/04* (2006.01)

(52) U.S. Cl.
CPC . *H04N 5/44* (2013.01); *G08C 23/04* (2013.01)
USPC .......................................................... 725/152

(58) Field of Classification Search
CPC .................... H04N 21/42204; H04N 21/4126; H04N 21/43615; H04N 5/4403
See application file for complete search history.

(56) References Cited

U.S. PATENT DOCUMENTS

| | | | |
|---|---|---|---|
| 5,113,438 A | 5/1992 | Blokker et al. | |
| 6,714,137 B1 | 3/2004 | Maxson et al. | |
| 2004/0148632 A1* | 7/2004 | Park et al. | 725/81 |
| 2005/0005297 A1* | 1/2005 | Lee | 725/81 |
| 2009/0061759 A1* | 3/2009 | Stoddard et al. | 455/1 |
| 2011/0149170 A1* | 6/2011 | Zamir et al. | 348/725 |
| 2013/0198796 A1* | 8/2013 | Brooks et al. | 725/129 |
| 2013/0212615 A1* | 8/2013 | Schultz | 725/25 |

OTHER PUBLICATIONS

Extended European Search Report for EP13199240 dated Feb. 25, 2014, 2 pages.

* cited by examiner

*Primary Examiner* — Jefferey Harold
*Assistant Examiner* — Samira Monshi
(74) *Attorney, Agent, or Firm* — Kilpatrick Townsend & Stockton LLP

(57) ABSTRACT

Methods, devices, and system for controlling communication between set top boxes and remote controls are presented. A set top box communication module may be configured to receive remote control data transmissions from a plurality of set top boxes. A first amplifier may be configured to receive the remote control data transmissions from the set top box communication module and amplify the remote control data transmissions on a plurality of remote control communication channels. The first amplifier may be configured to output the amplifier remote control data transmissions to one or more antennas. A jamming module may be configured to transmit a jamming signal to the plurality of set top boxes when the communication control device is receiving a remote control data transmission from a set top box of the plurality of set top boxes.

20 Claims, 8 Drawing Sheets

DELIBERATE COLLISION TRIGGERING IN MULTI-CHANNEL REMOTE CONTROL COMMUNICATION ENVIRONMENTS

CROSS REFERENCES TO RELATED APPLICATION

This application claims priority to U.S. Provisional Application No. 61/740,953, filed Dec. 21, 2012, entitled "Deliberate Collision Triggering in Multi-Channel Remote Control Communication Environments," the entire disclosure of which is incorporated by reference for all purposes.

BACKGROUND

In the past, a subscriber may have a relatively simple setup, such as a single television and a single set top box. Today, many subscribers have multiple televisions in multiple rooms throughout their residences or places of business, thus resulting in more complex television service installations. Accordingly, a subscriber may have multiple remote controls that the subscriber may use to control the multiple set top boxes. The use of multiple set top boxes along with multiple remote controls may result in circumstances where communication is occurring between multiple set top boxes and multiple remote controls simultaneously. Less than optimal performance may result from such concurrent communication.

SUMMARY

In some embodiments, a communication control system is presented. The communication control system may include a television receiver communication module configured to receive a remote control data transmission from a television receiver of a plurality of television receivers, wherein the remote control data transmission is to be transmitted to at least one remote control. The communication control system may include a first amplifier configured to receive the remote control data transmission from the television receiver communication module and amplify the remote control data transmission. The remote control data transmission may be amplified by the first amplifier on a remote control communication channel of a plurality of remote control communication channels on which the remote control data transmission is received. The first amplifier may be configured to output the amplified remote control data transmission to one or more antennas. The communication control system may include a jamming module configured to transmit a jamming signal to the plurality of television receivers while the television receiver communication module is receiving the remote control data transmission from the television receiver of the plurality of television receivers.

In embodiments of a such a communication control system, one or more of the following may be included: The jamming module may be configured to transmit the jamming signal on each remote control communication channel of the plurality of remote control communication channels to the plurality of television receivers. The jamming module may be configured to transmit the jamming signal on each remote control communication channel of the plurality of remote control communication channels to the plurality of television receivers other than the remote control communication channel on which the remote control data transmission is received by the television receiver communication module. The jamming signal may be configured to continue being transmitted for a period of time after the remote control data transmission has been transmitted, wherein the period of time is based upon a time duration of the remote control data transmission. The communication control system may include a second amplifier configured to amplify a data transmission received by the television receiver communication module from the at least one remote control, wherein the amplified data transmission is output to the plurality of television receivers. The first amplifier may be a power amplifier and the second amplifier is a low noise amplifier. The communication control system may include a splitter configured to electrically couple the television receiver communication module with the plurality of television receivers. The communication control system may include an antenna communication module configured to receive and output the amplified remote control data transmissions. The communication control system may include a plurality of antennas, wherein the plurality of antennas are configured to be electrically coupled with the antenna communication module. The jamming module may include a frequency modulator module, wherein the frequency modulator module is configured to output jamming signals across multiple remote control communication channels of the plurality of remote control communication channels simultaneously, wherein the jamming signals are based on the remote control data transmission and vary in frequency. The remote control data transmission may be selected from the group consisting of: a television receiver status message, an IR control table update, a DVR timer setting, a remote control firmware update, a remote control interface configuration message, a networking message; a prior message receipt status; and a message for presentation to a user.

In some embodiments, a communication control apparatus is presented. The communication control apparatus may include a module for receiving a data transmission from a computerized device of a first plurality of computerized devices. The data transmission may be to be transmitted to at least one computerized device of a second plurality of computerized devices. The communication control apparatus may include a module for amplifying the data transmission. The data transmission may be amplified by the module for amplifying on a communication channel of a plurality of communication channels on which the data transmission was received. The communication control apparatus may include a module for jamming configured to transmit a jamming signal to the first plurality of computerized devices while the module for receiving the data transmission is receiving the data transmission from the computerized device of the first plurality of computerized devices.

In embodiments of a such a communication control apparatus, one or more of the following may be included: The module for jamming may be configured to transmit the jamming signal on each communication channel of the plurality of communication channels to the first plurality of computerized devices. The module for jamming may be configured to transmit the jamming signal on each communication channel of the plurality of communication channels to the first plurality of computerized devices other than the communication channel on which the data transmission is received by the module for receiving. The module for jamming may be configured to continue to transmit the jamming signal for a period of time after data transmission has been transmitted. The apparatus may include a second module for amplifying configured to amplify a second data transmission received by the communication control apparatus from a second computerized device the second plurality of computerized devices, wherein the amplified second data transmission is output to the first plurality of computerized devices. The apparatus may include a module for splitting configured to electrically couple the module for receiving with the first plurality of computerized devices. The apparatus may include a module for transmitting the amplified data transmission. The apparatus may include a module for radiating configured to be electrically coupled with the module for transmitting and configured to wirelessly radiate the amplified data transmission. The apparatus may include a module for frequency modulation configured to output jamming signals across multiple communication channels of the plurality of communication channels simultaneously. The jamming signals may be based on the data transmission and vary in frequency.

In some embodiments, a method for jamming communication may be presented. The method may include receiving a remote control data transmission from a television receiver of a plurality of television receivers, wherein the remote control data transmission is to be transmitted to at least one remote control. The method may include amplifying the remote control data transmission on a remote control communication channel of a plurality of remote control communication channels. The remote control data transmission may be amplified on the remote control communication channel of the plurality of remote control communication channels on which the remote control data transmission was received. The method may include outputting the amplified remote control data transmission to one or more antennas. The method may include transmitting a jamming signal to the plurality of television receivers while the remote control data transmission is being received from the television receiver of the plurality of television receivers. In some embodiments, transmitting the jamming signal may include transmitting the jamming signal on each remote control communication channel of the plurality of remote control communication channels to the plurality of television receivers.

BRIEF DESCRIPTION OF THE DRAWINGS

A further understanding of the nature and advantages of various embodiments may be realized by reference to the following figures. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

Figure 1:
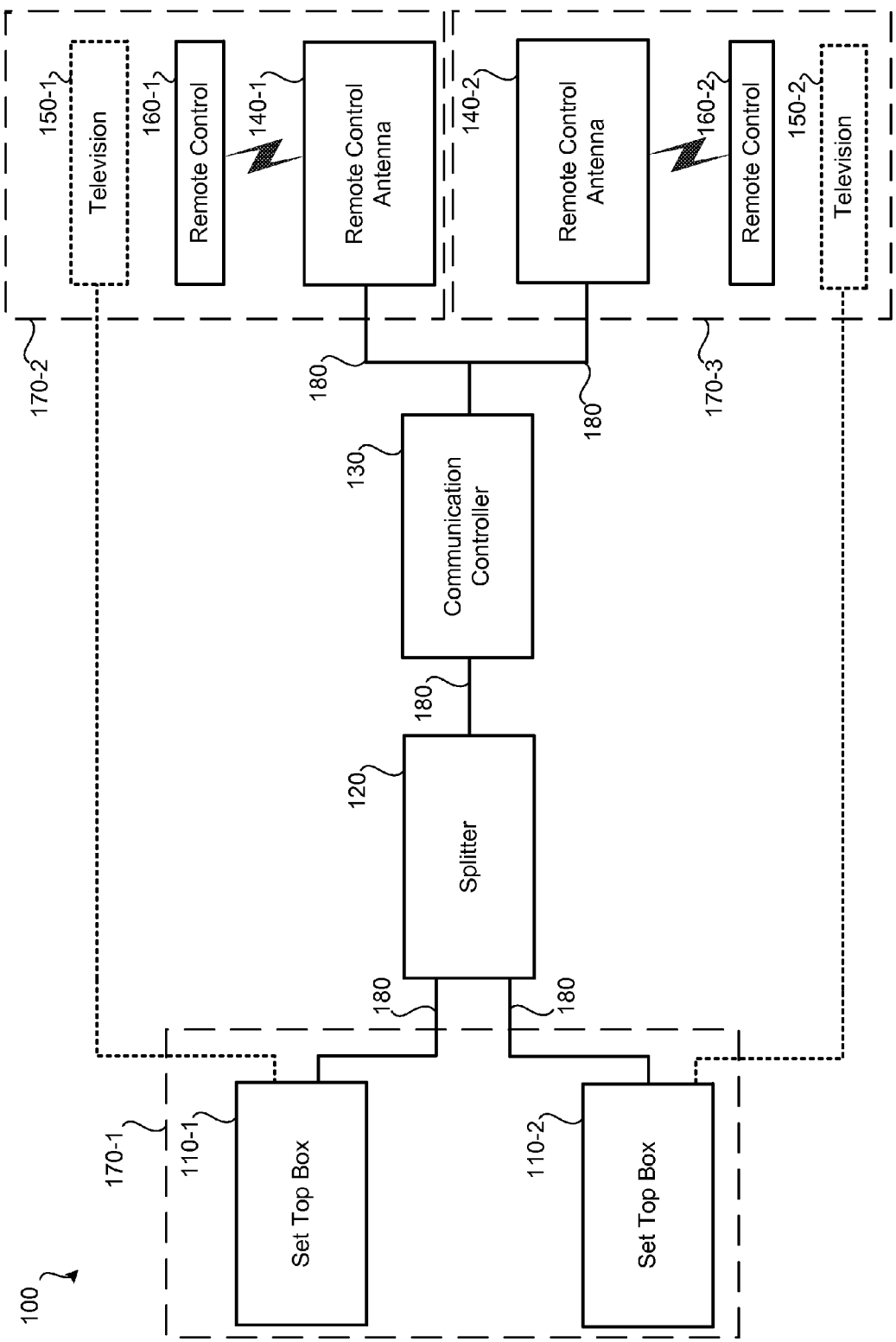
FIG. 1 illustrates an embodiment of a system for jamming communication between a set top box and a remote control.

Some subscribers to television service providers have multiple set top boxes (STBs) at their homes, places of business, or other locations where television services are desired. These STBs may be located in one or more locations at a distance from where the subscriber desires to use remote controls to interact with the STBs. As a simple example, a subscriber may have a first television and a first remote control in his living room and may have a second television and a second remote control in his kitchen. A set top box (STB) for each of these televisions may be located in a utility closet. Accordingly, each television may be wired (for video, and, possibly audio) to one of the STBs located within the utility closet. For the subscriber to be able to use the remote controls to control the STB for each television, antennas that are remote from the STBs that are configured to receive and transmit signals to the remote controls may be necessary. In some arrangements, a single communication line between multiple STBs that is connected with one or more antennas may be used. This single communication line may be used for both the antennas and STBs. As such, a signal transmitted by an STB to a remote control may be transmitted from each of the antennas connected with the single communication line and may also be received at other STBs connected with the communication line. Likewise, a signal transmitted by a remote control may be received by an antenna connected with the single communication line and may then be received by each STB.

Such an arrangement may be useful in various contexts. For example, in a home-based arrangement, a subscriber may want each of their STBs located in a single location. For aesthetics, space, or some other reason, the subscriber may not want the STBs co-located with the television (or other form of display device). As another example, some locations tend to have large numbers of televisions. A sports bar may have multiple televisions tuned to different television channels located in the same room (e.g., near the bar). An STB for each television may be located in a back room or closet. However, it may be desirable for the bartender (or some other person) to be able to control each STB for each television from the bar area (without needing to go within normal remote control range of the STBs). A single communication line connected with one or more antennas for communication with the remote controls may be coupled with the multiple STBs. Those with skill in the art will recognize other situations in which such an arrangement of STBs, televisions, antennas, and remote controls may also be useful. Also, it should be understood that STBs may include stereo equipment, BLU-RAY players, DVD players, computers, CD players, or other forms of equipment that can be controlled via remote control.

Communication between an STB and a remote control may not be limited to data being sent from a remote control to the STB. Rather, data may also be sent from the STB to the remote control. For example, status information about the STB (e.g., whether the STB is on or off), Infrared (IR) table information (e.g., for television compatibility), digital video recorder (DVR) timer settings, interface state (to enable/disable certain hardware such as joysticks, touchpads, OFNs, and/or keys), and software/firmware image downloads (e.g., to update the software/firmware of the remote control) may be sent by an STB to the remote control associated with the STB. In situations where a single communication line with a common power amplifier/low-noise amplifier device is shared between multiple STBs using a Carrier Sense Multiple Access (CSMA) transmission protocol, if a particular STB is sending data to its paired remote control, it may be desirable to prevent other STBs from attempting to send data to their paired remote controls. In some situations, multiple STBs transmitting data to multiple remote controls over the same communication line with a common amplification device may result in interference causing less than optimal operation. Such less than optimal operation may still occur if different channels are being used to transmit the data to the remote controls. As such, it may be desirable to prevent a second STB from transmitting data to its paired remote control if a first STB is currently transmitting data to its paired remote control.

To prevent a second STB from attempting to transmit data to its paired remote control, a communication controller may be coupled with the single communication line that senses when a first STB is transmitting data to its paired remote control. When such a data transmission is sensed, the communication controller may transmit a jamming signal to each of the STBs on at least the communication channels not being used to transmit by the first STB. Accordingly, a signal is present on the communication line to each of the STBs. When an STB is to transmit data to its paired remote control, it may first attempt to locate a communication channel that is free (at least down to a threshold amount) of any signals. Therefore, when a second STB attempts to begin the process of transmitting to its paired remote control while the jamming signal is being transmitted, the second STB will not send data because each channel has a signal present (each channel is "busy"). The second STB's attempt to send data to its paired remote control may occur once the transmission by the first STB is complete and the jamming signal has been stopped. Until the jamming signal ceases, the second STB may search for an available communication channel. If the search continues for greater than a threshold period of time, the transmission attempt by the second STB may time out and may be attempted again at a later time. Regardless of whether the second STB is searching for an available communication channel or the request times out, data may not be transmitted by the second STB using the single communication line during the data transmission, thus the data transmission by the first STB may not be adversely impacted. In some embodiments, if the second STB's message times out, the second STB will have information indicating that one or more busy channels caused the message to fail, rather than the remote not responding.

The communication controller may have features to keep the jammed channels jammed for some time after the first STB has finished transmitting while still enabling the low noise amplifier (LNA). The duration of the additional jamming may be dependent upon the duration of the message. For example, long messages may be followed by a short additional jamming period, and short messages may be followed by no additional jamming period. This aspect could be used to improve the probability of receiving timely acknowledgements. The particular durations may be dependent upon the one or more protocols in use.

An STB may typically be in the form of a separate device configured to be connected with a presentation device, such as a television. Embodiments of an STB may also be referred to as a "television receiver." A television receiver may be incorporated into another device, such as a television. For example, a television may have an integrated television receiver (which does not involve an external STB being coupled with the television). A television receiver may contain some or all of the components of an STB and/or may be able to perform some or all of the functions of an STB. Accordingly, instances in this document referring to an STB and steps being performed by an STB may also be performed by a television receiver.

FIG. 1 illustrates an embodiment of a system 100 for jamming communication between an STB and a remote control. System 100 may, for example, be located in a household or place of business of a television service subscriber. System 100 may include STBs 110, splitter 120, communication controller 130, remote control antennas 140, and remote controls 160. For the subscriber to receive television services (e.g., viewing or television channels, on-demand services, DVR services, electronic programming guide (EPG) services, etc.) the subscriber may need to have an STB. A separate STB may be required for each television (or other form of display device) through which the subscriber desires to receive television services.

STBs 110 may be located in a location 170-1 that is remote from locations 170-2 and location 170-3 of televisions 150 and remote controls 160. In some embodiments, STBs 110 are located in the same location; in other embodiments STBs 110 may be located in different locations. The distance and/or obstacles between locations 170-1 and 170-2 and locations 170-1 and 170-3 may result in remote controls 160 being unable to communicate directly with STBs 110. Rather, a communication line with one or more antennas may be necessary to facilitate communication between remote controls 160 and STBs 110.

Figure 7:
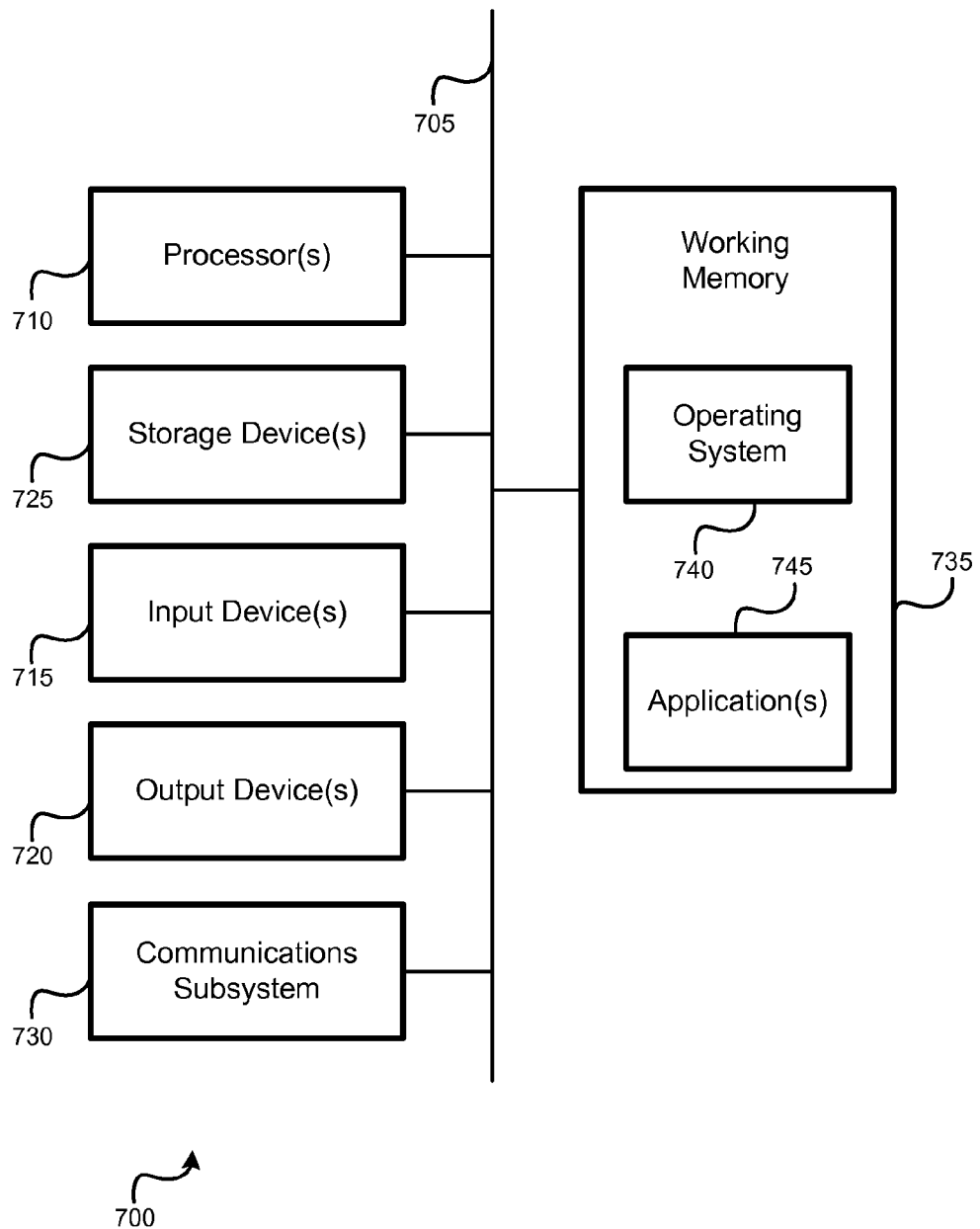
FIG. 7 illustrates an embodiment of a computer system.

Each of STBs 110 may be connected with a satellite antenna (not shown) or some other signal input provided by a television service provider. Each STB of STBs 110 may be configured to tune to one or more television channels simultaneously. Each STB of STBs 110 may be configured to output video and/or audio signals to a display device, such as a television channel. Each STB may be a computerized device with at least some componentry similar to a computer system, such as a computer-readable storage medium and processor. An STB may be stereo equipment, a disc player (e.g., CD, BLU-RAY) or some other device that may interact with a remote control. FIG. 7 illustrates an exemplary computer system. Each STB may be coupled with a display device, such as a television. In system 100, STB 110-1 is communicatively coupled with television 150-1. STB 110-2 is communicatively coupled with television 150-2. This may involve one or more wires or cables being connected between the STBs 110 and televisions 150. For example, a first cable may be an HDMI cable for video and one or more additional cables may be used to transmit audio signals from each STB of STBs 110 to their respective television of televisions 150. Such cables/wires may be separate from the communication line used for communication with remote controls 160.

Remote control 160-1 may be paired with STB 110-1. By being paired, based on identifying information transmitted by remote control 160-1, STB 110-1 may be able to distinguish transmissions from remote control 160-1 from data transmissions from other remote controls, such as remote control 160-2. Data transmissions from remote control 160-1 may include a header that includes an identifier of remote control 160-1 (or of STB 110-1). This identifier may be unique from other remote controls. Data transmitted by remote control 160-1 and received by an STB other than STB 110-1 (e.g., STB 110-2) may be ignored. Data transmitted by STB 110-1 to remote control 160-1 may be addressed to remote control 160-1 such that other remote controls (e.g., remote control 160-2) ignore the data. Since data transmitted between remote controls 160 and STBs 110 are addressed to particular devices, a single communication line may be shared among multiple pairs of STBs/remote controls.

Remote controls 160 may be computerized devices configured to receive, transmit, process, and store data. A remote control may leave at least some of its componentry represented by a computer system, such as computer system 700 of FIG. 7. A user may use a remote control of remote controls 160 to provide input to an STB of STBs 110. Common forms of input that are sent as a data transmission to an STB may include a channel change command, a volume change command, a command to interact with an EPG, a command to control DVR functions, and a power on/off command. Remote controls 160 may also receive data from STBs 110. Data received by a remote control from an STB may provide an indication that the preceding command was received or a status of the STB, such as whether the STB is powered on or off. Data received from an STB by a remote control may also provide an update to an infrared (IR) command table stored by the remote control. Such an IR table may contain data on various data formats used by televisions, receivers, DVD/BLU-RAY players, radios, and CD players for remote controls. Such an IR table may allow a remote control to control various manufacturers' equipment. As an example, a single remote control may be used to control a television, a BLU-RAY player, and an STB. Data received from an STB by a remote control may also be used as a backup of DVR timer settings. If a computer readable storage device of an STB was to fail, or the STB was replaced by a new STB, the timer settings for the (old) DVR of the STB may be stored by the remote control and may be retrieved by the (new) STB. Other forms of data may also be stored by the remote control. Data received from an STB by a remote control may also be new software or firmware for the remote control. If a new function is to be added to a remote control, a new software or firmware image may be downloaded by the remote control from the STB. As those with skill in the art will understand, additional various types of information may be transmitted by an STB to a remote control.

Since STB 110-1 is in location 170-1 remote from location 170-2, remote control antenna 140-1 with communication line 180 may be used to enable communication between a remote control and its paired STB. Remote control 160-1 may transmit signals to and receive signals from remote control antenna 140-1. Remote control antenna 140-1 may use communication line 180 to communicate with STB 110-1. While remote control 160-1 may not be able to send and receive signals directly with STB 110-1, via remote control antenna 140-1 and communication line 180, signals may be exchanged between STB 110-1 and remote control 160-1.

Similar to STB 110-1, STB 110-2 may be in location 170-1 remote from location 170-3. A remote control antenna 140-2 connected with communication line 180 may be used to enable communication between remote control 160-2 and its paired STB 110-2. Remote control 160-2 may transmit signals to and receive signals from remote control antenna 140-2. Remote control antenna 140-2 may use communication line 180 to communicate with STB 110-2. While remote control 160-2 may not be able to send and receive signals directly with STB 110-2, via remote control antenna 140-2 and communication line 180, signals may be exchanged between STB 110-1 and remote control 160-1. While each remote control of system 100 communicates using a separate remote control antenna, it should be understood that a single remote control antenna may be used for multiple remote controls.

Communication line 180 may carry data transmissions between one or more remote controls antennas 140 and STBs 110. Communication line 180 may be a wire, such as coaxial cable or a twisted pair. Communication line 180 may be separate from a wire or cable carrying video and/or audio communication. Communication line 180 may be used to carry data transmissions between multiple remote controls 160 and multiple STBs 110. Communication line 180 may have one or more splitters on it to allow for multiple remote control antennas 140 and/or multiple STBs 110 to be connected to communication line 180. Present on communication line 180 may be communication controller 130, detailed in relation to FIGS. 2-4. Remote controls 160 and STBs 110 may communicate over communication line 180 using the IEEE 802.15.4 standard, which allows for multiple channels of data transmission. For example, under IEEE 802.15.4, 30 channels may be available for data transmission between 902 MHz and 928 MHz. In some embodiments, fewer channels may be available. For example, only three channels may be available, such as one channel at 2425 MHz, one channel at 2450 MHz, and one channel at 2475 MHz. Wireless communication between remote control antennas 140 and remote controls 160 may use the same channels and standard.

Since a single communication line 180 is used, a data transmission from remote control 160-1 to remote control antenna 140-1 may be received by each of STBs 110. Likewise, a transmission by communication controller 130 may be received by each of STBs 110. A data transmission from an STB of STBs 110 may be received by each other STB of STBs 110 and may also be transmitted by each of remote control antennas 140.

Each of remote control antennas 140 may be a quarter-wave antenna or some other form of antenna. Amplification of received and transmitted signals may be performed by communication controller 130.

While system 100 of FIG. 1 illustrates two STBs 110, a single splitter 120, two televisions 150, two remote controls 160, and two remote control antennas 140, it should be understood that this arrangement is for illustration purposes only. More STBs, splitters, remote controls, and remote control antennas 140 may be present. For example, a single communication line 180 may be used for communication between three STBs and three remote controls. In such an arrangement, two splitters may be used, or a single three-way splitter may be used. Other variations are also possible, such as one remote control that is used to control multiple STBs.

Figure 2:
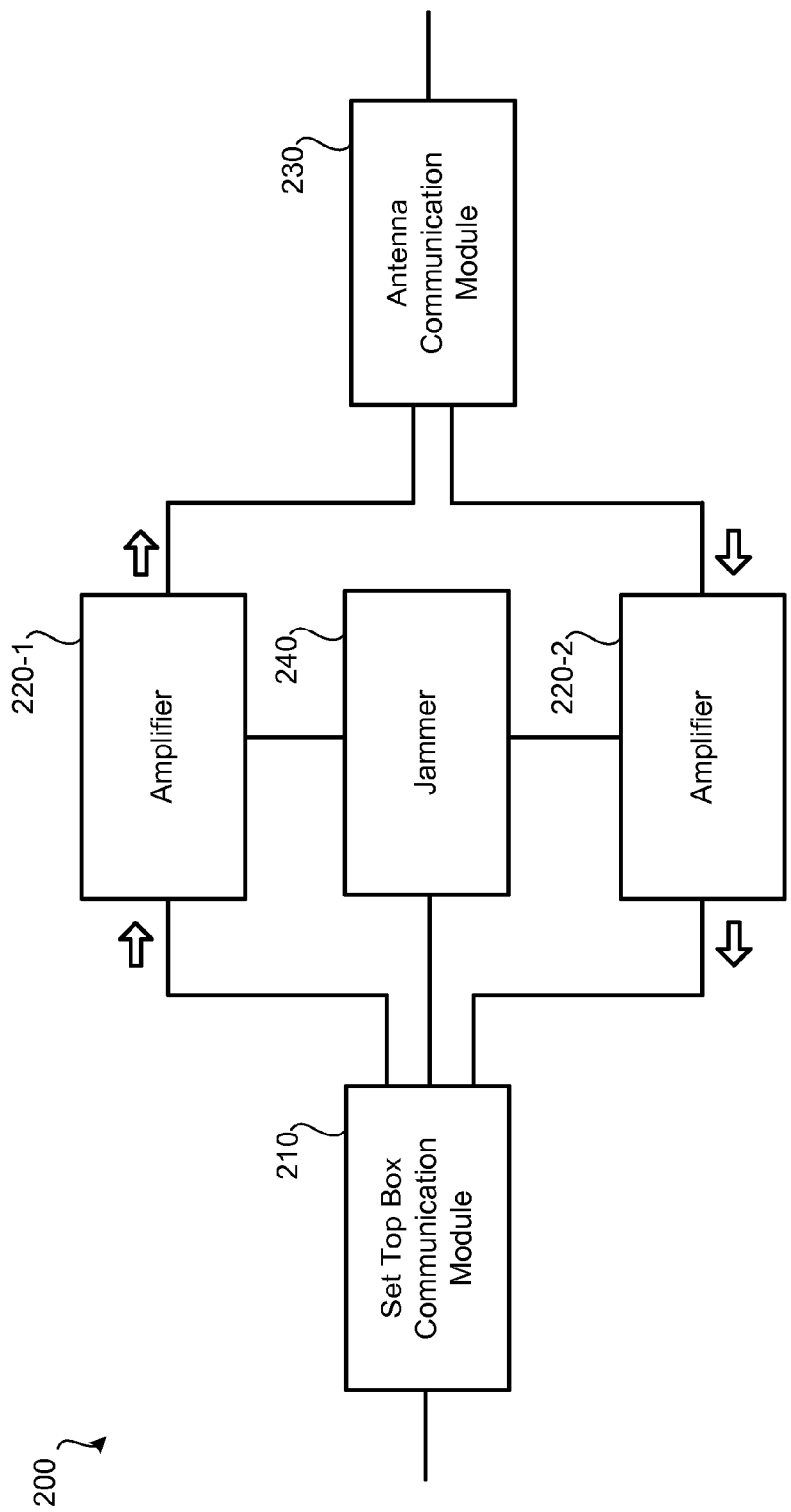
FIG. 2 illustrates an embodiment of a communication controller.

FIG. 2 illustrates an embodiment of a communication controller 200. Communication controller 200 may represent communication controller 130 of FIG. 1 or some other communication controller 200. Communication controller 200 may jam one or more communication channels while a data transmission is occurring between an STB and a remote control. Such jamming may occupy the channel and may trigger a "collision" when a second STB attempts to transmit data to a remote control. As such, the second STB may be forced to wait until the first STB has completed its communication with its paired remote control. Communication controller 200 may include: STB communication module 210, amplifiers 220, antenna communication module 230, and jammer 240. It should be understood that FIG. 2 represents a block diagram of communication controller 200. Detail of commonly known components and circuitry has been omitted for simplicity. It should be understood that at least some illustrated components may be divided into additional components or combined and illustrated as fewer components.

STB communication module 210 may serve to receive data for transmission to multiple remote controls from multiple STBs. STB communication module 210 may receive the data for transmission from the multiple STBs via a single communication line. The single communication line may be split one or more times to be connected with multiple STBs. STB communication module 210 may also output data received from remote controls being transmitted to the STBs and may output signals generated by jammer 240.

Amplifier 220-1 may amplify data being transmitted by an STB to a remote control. Amplifier 220-1 may receive data for transmission to a remote control from STB communication module 210 and may amplify the data transmission. Amplifier 220-1 may be a power amplifier (PA). Amplifier 220-1 may be configured to amplify across multiple channels. Amplifier 220-1 may amplify a signal on the channel on which it is received.

Antenna communication module 230 may serve to transmit data to multiple remote controls from multiple STBs. Antenna communication module 230 may receive data transmission signals from amplifier 220-1 and may output the amplified data transmissions to one or more antennas, possibly via a single communication line. Antenna communication module 230 may also receive data transmission from remote controls to be transmitted to STBs.

Data transmissions received by antenna communication module 230 may be sent to amplifier 220-2. Amplifier 220-2 may amplify data being transmitted by a remote control to an STB. Amplifier 220-2 may receive data (e.g., a command) for transmission to an STB from antenna communication module 230. Amplifier 220-2 may amplify the data transmission and transmit the data to STB communication module 210 for output to the STBs. Amplifier 220-2 may be a low-noise amplifier (LNA). Amplifier 220-2 may be configured to amplify data transmission across multiple channels. Amplifier 220-2 may amplify a data transmission on the channel on which it is received.

Jammer 240 may be configured to output a jamming signal when a data transmission signal is being received from an STB. Jammer 240 may be communicatively coupled with STB communication module 210 and/or amplifier 220-1 to determine when a data transmission is being received from an STB. When such data is being received from an STB, jammer 240 may output noise. The noise output by jammer 240 may be in the form of one or more frequency tones, white noise, frequency modulation of the received signal, or some other signal configured to make communication channels busy.

In some embodiments, jammer 240 may output the noise on each channel that the STBs may use to transmit data to remote controls. Such embodiments may include the noise being transmitted on the channel on which the data transmission is being received from the STB. The power level of the noise transmitted may be low enough that the data transmission is not significantly affected; however, the power level of the noise transmitted may be great enough that an STB that is to transmit data to a remote control would not use the channel because it is busy. Accordingly, the noise generated by jammer 240 on each channel may be greater than a threshold level that an STB checks before using a channel for a data transmission to a remote control. Jammer 240 may use amplifier 220-2 to amplify the jamming signal that is output to the STBs on the channels or may output the jamming signal directly via STB communication module 210.

In some embodiments, jammer 240 may output the jamming signal on each channel that the STBs use to transmit data to remote controls except for the channel on which a data transmission is being received from the STB. Accordingly, if there are 10 channels and a data transmission is being received from an STB on channel 4, jammer 240 may output noise on channels 1-3 and 5-10.

Figure 3A:
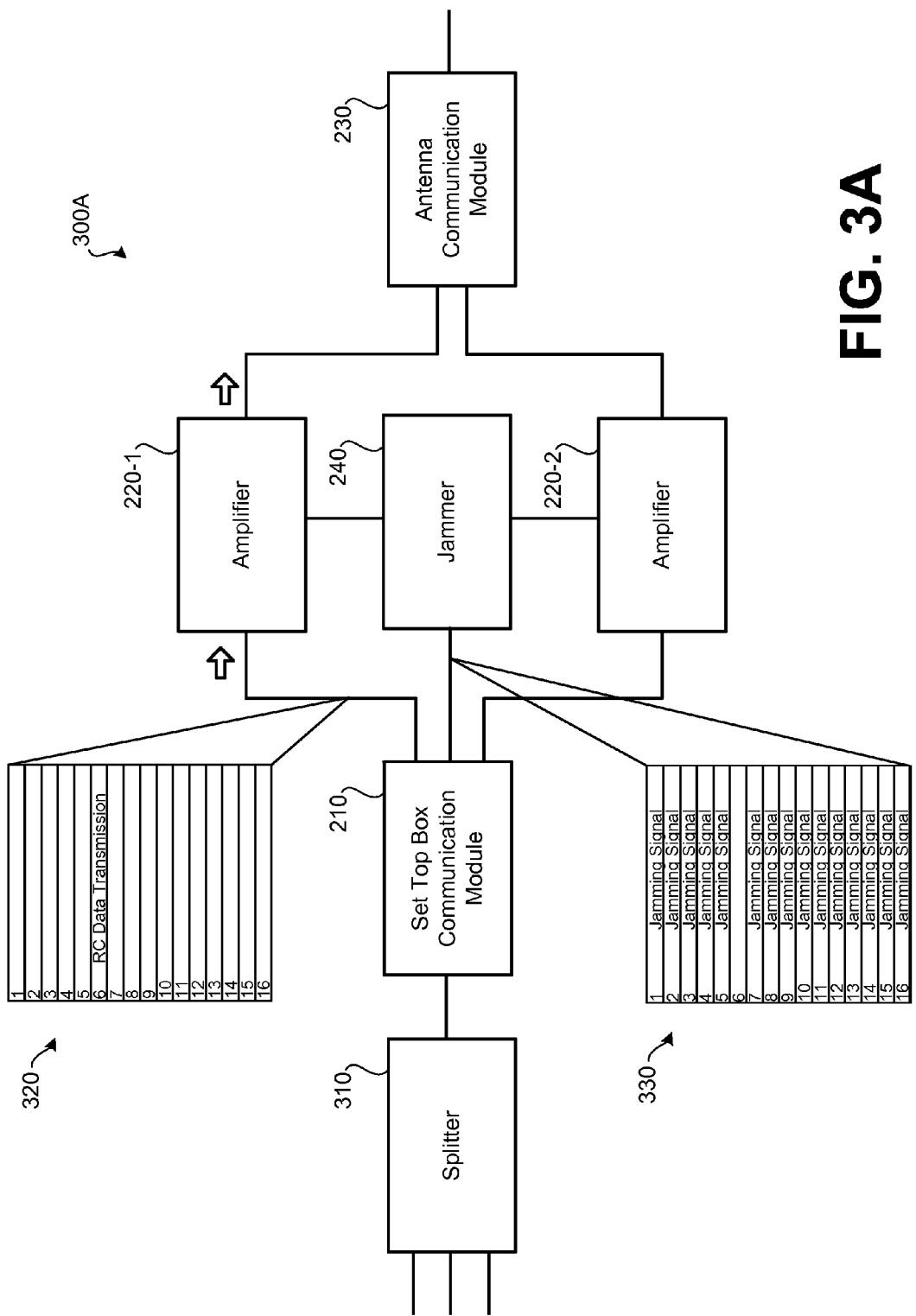
FIG. 3A illustrates an embodiment of a communication controller transmitting a jamming signal on channels that do not have a data transmission present.

FIG. 3A illustrates an embodiment of a communication controller 300A jamming channels on which a remote control (RC) data transmission is not being received from an STB. Communication controller 300A may represent communication controller 130 of FIG. 1. Communication controller 300A may represent communication controller 200 of FIG. 2. In the illustrated embodiment, 16 communication channels are present. It should be understood that in other embodiments a greater number of channels or a fewer number of channels may be present. The number of channels may be dictated by the standard being used for data transmissions and/or the hardware capabilities of the system components. Communication controller 300A is receiving a remote control data transmission from an STB on channel 6. Channel breakout 320 illustrates that a remote control data transmission is being received on channel 6 from an STB while no other data transmission is being received on another channel. The remote control data transmission on channel 6 may be amplified by amplifier 220-1 and output to one or more antennas for transmission to a remote control via antenna communication module 230. Jammer 240, in response to the remote control data transmission being present on channel 6 may output a jamming signal on each other channel. Channel breakout 330 illustrates how a jamming signal may be output on every channel except channel 6. To each STB connected with splitter 310, each of the 16 channels may appear to be in use: channels 1 through 5 with jamming signals, channel 6 with the remote control data transmission, and channels 7 through 16 with jamming signals. Due to every channel having a signal present, an STB attempting to transmit a data transmission will identify each channel as busy and may not send the data transmission.

Jammer 240, as illustrated, outputs the jamming signals on every channel except for channel 6 directly to STB communication module 210. In some embodiments, jammer 240 may output these jamming signals to amplifier 220-2 for amplification. Amplifier 220-2 may then, in turn, output jamming signals on channels 1 through 5 and channels 7 through 16 to STB communication module 210.

Communication controller 300A of FIG. 3A comprises splitter 310. In various embodiments, a splitter may or may not be part of the communication controller. Splitter 310 is illustrated as being a three-way splitter. It should be understood that other types of splitters may be used, such as a two way splitter or four way splitter. The number of split connectors of splitter 310 may be based on the number of STBs that are to be connected with communication controller 300.

Figure 3B:
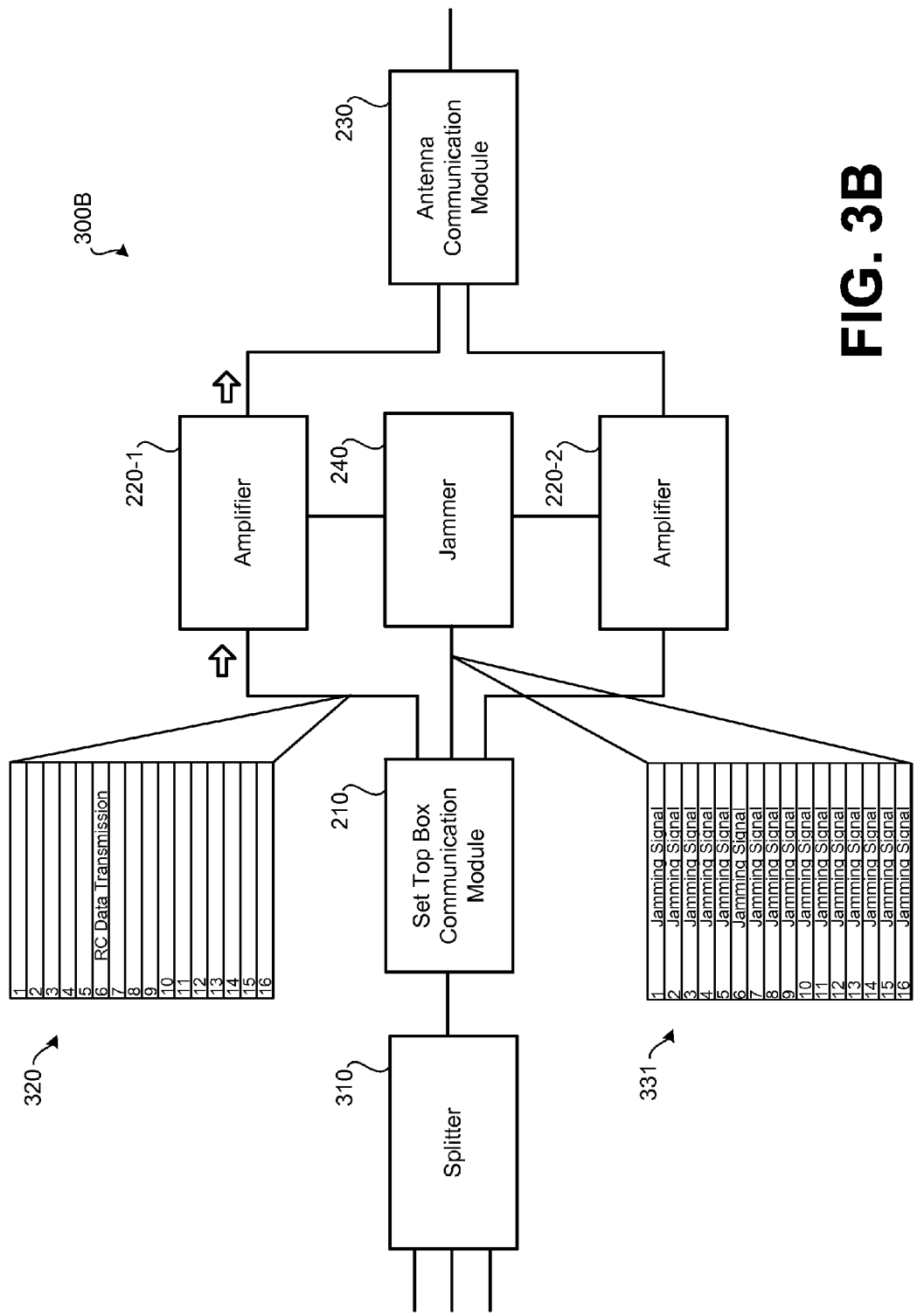
FIG. 3B illustrates an embodiment of a communication controller transmitting a jamming signal on all channels.

FIG. 3B illustrates an embodiment of a communication controller 300B jamming every channel. Communication controller 300B may represent communication controller 130 of FIG. 1. Communication controller 300B may represent communication controller 200 of FIG. 2. In the illustrated embodiment, 16 communication channels are present. It should be understood that in other embodiments a greater number of channels or a fewer number of channels may be present. The number of channels may be dictated by the standard being used for data transmissions. Similar to FIG. 3A, communication controller 300B is receiving a remote control data transmission from an STB on channel 6. Channel breakout 320 illustrates that a remote control data transmission is being received on channel 6 while no other data transmission is being received on another channel. The remote control data transmission on channel 6 may be amplified by amplifier 220-1 and output to one or more antennas for transmission to a remote control via antenna communication module 230.

Jammer 240, in response to the remote control data transmission being present on channel 6 may output a jamming signal on every channel. Channel breakout 331 illustrates how a jamming signal is output on every channel. To each STB connected with splitter 310, each of the 16 channels may appear to be in use: channels 1 through 5 with jamming signals, channel 6 with the remote control data transmission and a jamming signal, and channels 7 through 16 with jamming signals. Due to every channel having a signal present, an STB attempting to transmit a data transmission will identify each channel as busy and may not send the data transmission. The jamming signal present on channel 6 may be of a power level that is insufficient to significantly negatively impact a remote control receiving the remote control data transmission. The jamming signal may be of sufficient power such that on each other channel where the jamming signal is present, an STB will identify the channel as busy.

Jammer 240, as illustrated, outputs the jamming signals on every channel directly to STB communication module 210. In some embodiments, jammer 240 may output these jamming signals to amplifier 220-2 for amplification. Amplifier 220-2 may then, in turn, output jamming signals on channels 1 through 16 to STB communication module 210.

Figure 4:
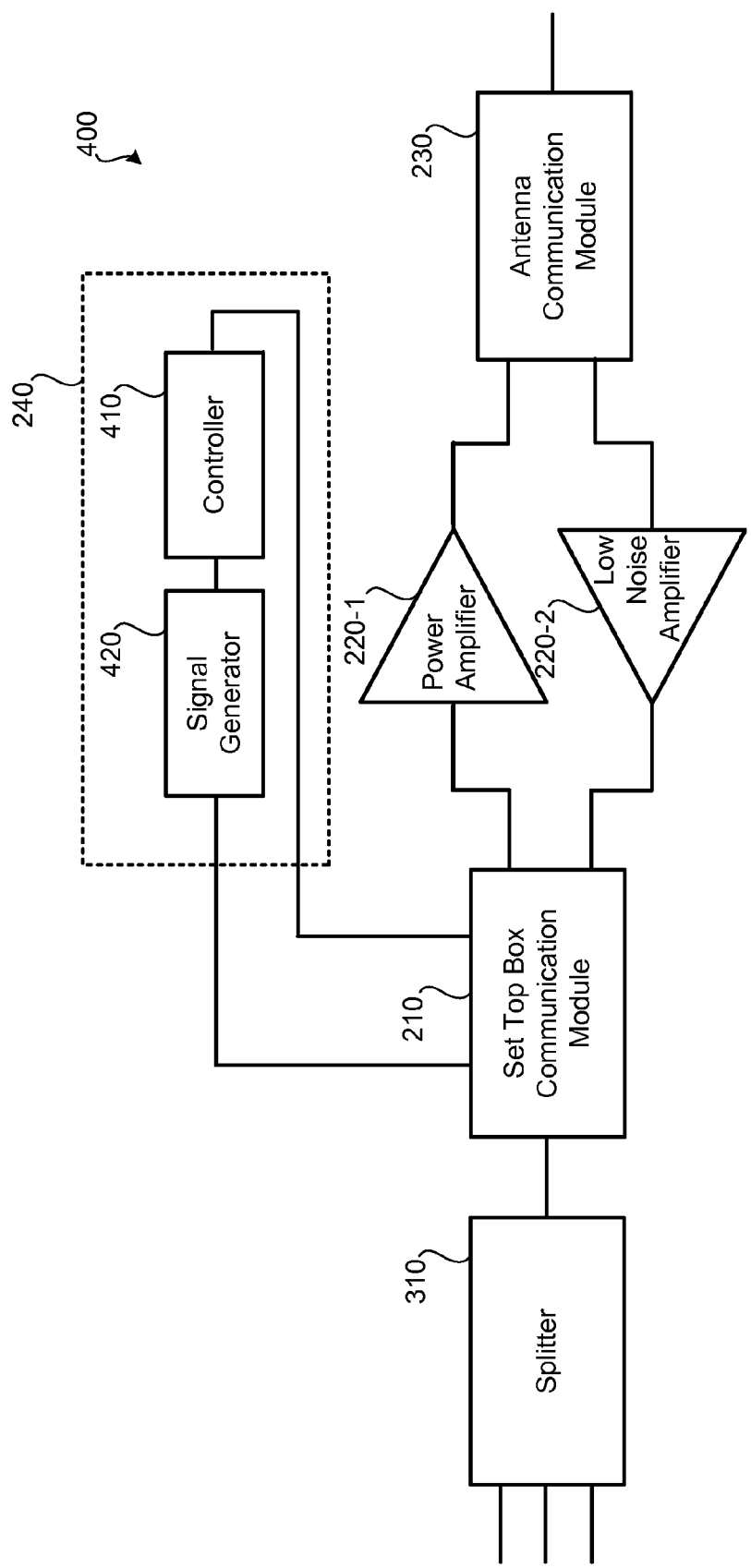
FIG. 4 illustrates yet another embodiment of a communication controller.

FIG. 4 illustrates an embodiment of a communication controller 400. Communication controller 400 may represent the communication controllers present in FIGS. 1, 2, 3A, and/or 3B. Alternatively, communication controller 400 may represent some other form of communication controller. Communication controller 400 may include: STB communication module 210, power amplifier 220-1, low noise amplifier 220-2, antenna communication module 230, and jammer 240, which may include controller 410 and signal generator 420.

Jammer 240 of communication controller 400 may include two components: controller 410 and signal generator 420. Controller 410 may be a processor and may serve to determine when a remote control data transmission is being received by STB communication module 210 from an STB. Controller 410 may also serve to determine which channel the remote control data transmission is present on. In embodiments where the jamming signal is transmitted on each channel, it may not be necessary to determine which specific channel contains the remote control data transmission but rather only that the data transmission is or is not present. Controller 410 may enable and disable signal generator 420.

Based on input from controller 410, signal generator 420 may output a jamming signal. The jamming signal may be one or more tones, white noise, and/or frequency modulated instances of the STB-transmitted signal. Those of skill in the art will recognize that other forms of a jamming signal may be output by signal generator 420. Input from controller 410 may determine when signal generator 420 outputs a jamming signal. Input from controller 410 may also determine on which channels signal generator 420 outputs a jamming signal. For example, referring to FIG. 3A, a jamming signal may be output on channels 1 through 5 and 7 through 16. In such embodiments, the channel on which the remote control data transmission is received may not have a jamming signal output on the same channel. Referring to FIG. 3B, signal generator 420 may output a jamming signal on each channel that an STB may use for data transmissions to a remote control, as presented in channel breakout 331.

Further, in communication controller 400, amplifier 220-1 is specifically designated as a power amplifier. A power amplifier may be used to generate a significantly strong enough signal to be radiated by one or more antennas for wireless transmission to a remote control. In the illustrated embodiment, amplifier 220-2 has been specifically designated as a low noise amplifier. A low noise amplifier may be used to amplify wireless signals received from remote controls via the one or more antennas connected with antenna communication module 230. In some embodiments, the jamming signal output by jammer 240 may not be output by antenna communication module 230. In other embodiments, the jamming signal output by jammer 240 is output to antenna communication module 230 and thus to the one or more antennas connected with antenna communication module 230.

In the embodiments detailed in relation to FIGS. 1 through 4, transmitting a jamming signal to each STB when another STB is performing a data transmission to a remote control has been focused on. It should be understood that similar principles may be applied in the opposite direction: jamming signals may be emitted by each antenna to the remote controls when a remote control is conducting a data transmission to an STB. While some of such data transmissions are short (e.g., a channel change command), other data transitions may be longer, such as downloading DVR timers from a remote control to an STB.

Figure 5:
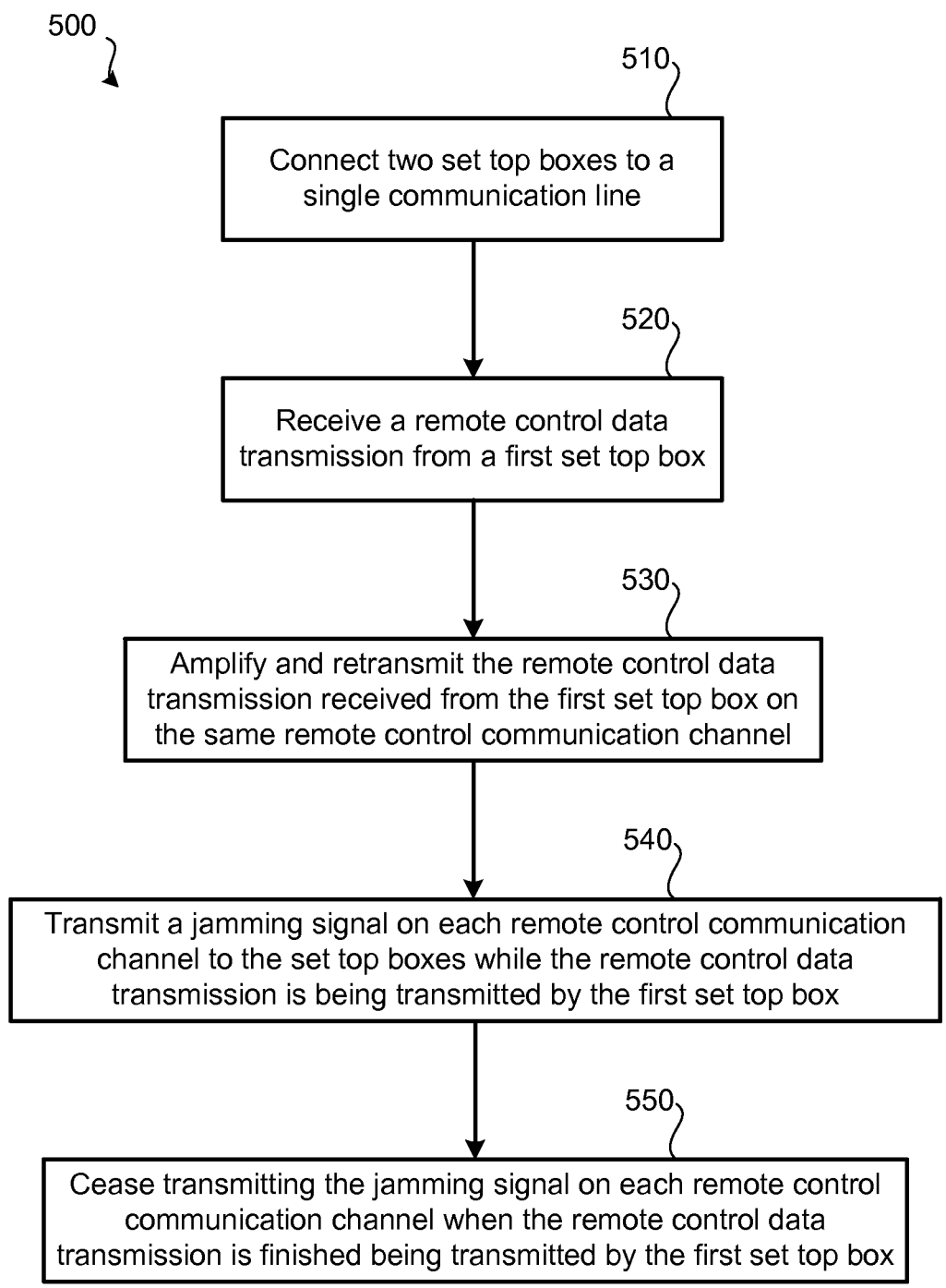
FIG. 5 illustrates an embodiment of a method for jamming communication between one or more set top boxes and one or more remote controls.

Various methods may be performed using the devices and systems of FIGS. 1 through 4. FIG. 5 illustrates an embodiment of a method 500 for jamming communication between one or more STBs and one or more remote controls. Method 500 may be performed using system 100, communication controller 200, communication controller 300A, communication controller 300B, and/or communication controller 400. Method 500 may also be performed using some other system or device for jamming communication between one or more STBs and one or more remote controls. Means for performing method 500 include: STBs, communication controllers, splitters, remote controls, remote control antennas, power amplifiers, low noise amplifiers, signal generators, communication lines (e.g., wires), controllers (e.g., processors), and/or other computerized devices. A common PA/LNA device may be used by the set top boxes in the system performing method 500.

At step 510, two or more STBs may be connected to a single communication line. This communication line may be used for communication with remote controls. A remote control may be a handheld device used by a television service subscriber to provide input to an STB. Common commands entered by a television service subscriber to remote control may include channel change commands, volume change commands, EPG commands, DVR timer commands, etc. Communication with remote control may be two-way: data may be transmitted from an STB to a remote control and data may be transmitted from a remote control to an STB. Connection of two STBs to a single communication line may involve the use of one or more splitters. Since a single communication line may be used, data transmitted by STB may be received by each other STB connected to the communication line. Similarly, data transmitted on the communication line by remote control may be received by each STB connected with the single communication line. While in step 510 only two STBs are connected with the single communication line, it should be understood that a greater number of STBs may be connected with the single communication line.

At step 520, a remote control data transmission may be received by communication controller from a first STB. Data transmitted by an STB to a remote control may: provide a status of the STB, such as whether the STB is powered on or off; provide an update to an IR table stored by the remote control; and/or be used as a backup of DVR timer settings, to name only a few examples.

At step 530, an amplifier of the communication controller may be used to amplify and retransmit the remote control data transmission received from the first STB to the remote control using the single communication line and one or more antennas. Amplifying the remote control data transmission may be necessary due to a length of the antenna communication line and/or due to distance between the antenna and remote. The remote control data transmission may be amplified and retransmitted on the same channel on which the communication controller received the remote control data transmission.

At step 540, a jamming signal may be transmitted on each remote control communication channel for the duration of time in which the remote control data transmission is being received from the first STB. As such, the jamming signal may be transmitted to each STB connected with the single communication line, including the first STB and the second STB. In some embodiments, the jamming signal may be transmitted on every channel that the STBs may use for transmitting data to a remote control. Therefore, the jamming signal may be transmitted on the channel on which the remote control data transmission was received by the communication controller. In some embodiments, the jamming signal is only transmitted on channels other than the channel on which the remote control data transmission was received from the first STB. In such embodiments, to the second STB, each channel may appear busy because either a jamming signal or the remote control data transmission is present.

At step 550, transmission of the jamming signal on each channel on which that the jamming signal is being transmitted may be ceased. The transmission of the jamming signal may be ceased in response to the first STB ceasing to transmit the remote control data transmission. As such, the jamming signal may only be transmitted during the period of time when the remote control data transmission is being transmitted by the STB. By ceasing the jamming signal, one or more communication channels may now be available for use by other STBs, such as the second STB, for use in communicating with a remote control.

Figure 6:
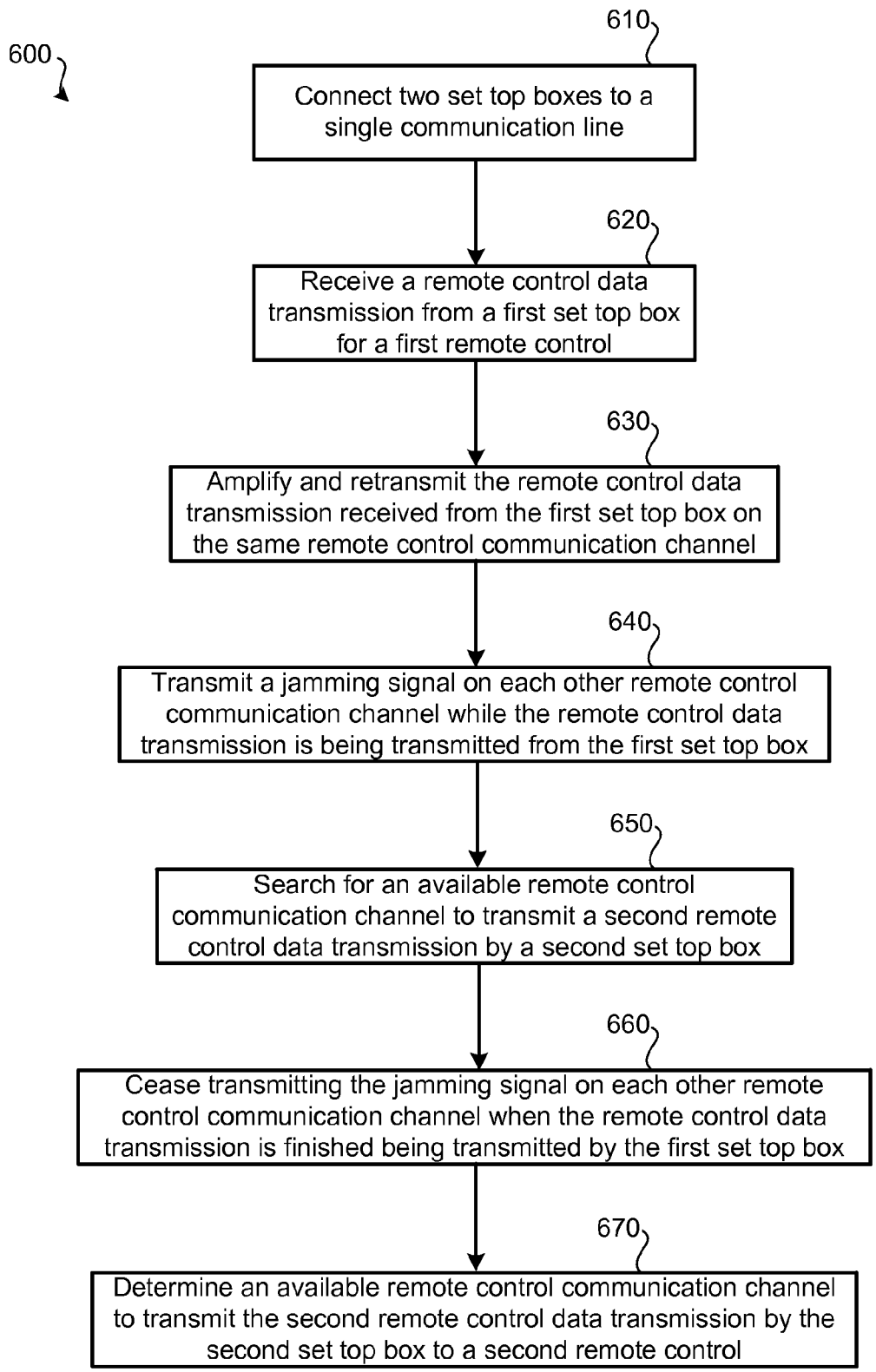
FIG. 6 illustrates another embodiment of a method for jamming communication between one or more set top boxes and one or more remote controls.

FIG. 6 illustrates an embodiment of a method 600 for jamming communication between one or more STBs and one or more remote controls. Method 600 may be performed using system 100, communication controller 200, communication controller 300A, communication controller 300B, and/or communication controller 400. Method 600 may be performed using some other system or device for jamming communication between one or more STBs and one or more remote controls. Means for performing method 600 include: STBs, communication controllers, splitters, remote controls, remote control antennas, power amplifiers, low noise amplifiers, signal generators, communication lines (e.g., wires), controllers (e.g., processors), and/or other computerized devices. A single PA/LNA device may be shared among set top boxes in the system performing method 600. Method 600 may be a more detailed embodiment of method 500.

At step 610, two or more STBs may be connected to a single communication line. This communication line may be used for communication with remote controls. A remote control may be a handheld device used by a television service subscriber to provide input to an STB. Common commands entered by a television service subscriber to remote control may include channel change commands, volume change commands, EPG commands, DVR timer commands, etc. Communication with remote control may be two-way: data may be transmitted from an STB to a remote control and data may be transmitted from a remote control to an STB. Connection of two STBs to a single communication line may involve the use of one or more splitters. Since a single communication line may be used, data transmitted by an STB may be received by each other STB connected to the communication line. Similarly, data transmitted on the communication line by remote control may be received by each STB connected with the single communication line. While in step 610 only two STBs are connected with the single communication line, it should be understood that a greater number of STBs may be connected with the single communication line.

At step 620, a remote control data transmission may be received by communication controller from a first STB. Data transmitted by a first STB to a remote control may: provide a status of the STB, such as whether the STB is powered on or off; provide an update to an IR table stored by the remote control; and/or be used as a backup of DVR timer settings, to name only a few examples.

At step 630, an amplifier of the communication controller may be used to amplify and retransmit the remote control data transmission received from the first STB to the remote control using the single communication line and one or more antennas. Amplifying the remote control data transmission may be necessary due to a length of the communication line. The remote control data transmission may be amplified and retransmitted on the same channel on which the communication controller received the remote control data transmission.

At step 640, a jamming signal may be transmitted on each remote control communication channel for the duration of time in which the remote control data transmission is being received from the first STB. As such, the jamming signal may be transmitted to each STB connected via the single communication line, including the first STB and the second STB. In some embodiments, the jamming signal may be transmitted on every channel that the STBs may use for transmitting data to a remote control. Therefore, the jamming signal may be transmitted on the channel on which the remote control data transmission was received by the communication controller. In some embodiments, the jamming signal is only transmitted on channels other than the channel on which the remote control data transmission is being received from the first STB. In such embodiments, to the second STB, each channel may appear busy because either a jamming signal or the remote control data transmission is present.

At step 650, the second STB may attempt to transmit a data transmission to a second remote control. This may occur while the jamming signals are being transmitted. The remote control to which the second STB is attempting to transmit data may be different than the remote control to which the first STB is transmitting the remote control data transmission. When the second STB attempts to transmit a data transmission, the second STB may search for a channel that is not busy. A channel that is not busy may involve determining whether signals on the channel have less than a threshold power level. A jamming signal being present on a channel or a data transmission from another STB on a channel may be greater than the threshold power level and may result in the channel being identified as busy. At step 650, the second STB may check multiple channels sequentially until an available channel is identified. If all channels are busy, the search may continue until a channel becomes available or a timeout occurs.

At step 660, transmission of the jamming signal on each channel on which that the jamming signal is being transmitted may cease by the communication controller. The transmission of the jamming signal may be ceased in response to the first STB ceasing to transmit the remote control data transmission. This may be implemented by ceasing to transmit the jamming signals when the combined signals from the STBs fall below a certain threshold. In some implementations, the jamming signal may continue to be transmitted for a short period depending upon the duration of the remote data signal; this period may allow for acknowledgement messages to be received from the remote control by the STB. As such, the jamming signal may only be transmitted during the period of time when the remote control data transmission is being transmitted and possibly for a predefined period of time afterward. By ceasing the jamming signal, one or more communication channels may now be available for use by other STBs, such as the second STB, for use in communicating with a remote control.

At step 670, the second STB may determine an available communication channel. Since the jamming signal and the remote control data transmission from the first STB ceased at step 660, at least one channel may be available for transmission by the second STB. Determining the available communication channel may occur as part of the initial search conducted at step 650 by the second STB. Alternatively, the available communication channel may be determined as part of a second search following a timeout of the first search. When the second STB sends its remote control data transmission, jamming may occur to prevent the first STB and any other STB connected with the single communication line from transmitting a simultaneous data transmission to a remote control.

A computer system as illustrated in FIG. 7 may be incorporated as part of the previously described devices. For example, the functions of at least some of the components of a communication controller may be performed by a computer system. Similarly, some or all of the steps of the methods may be performed by a computer system. It should be noted that FIG. 7 is meant only to provide a generalized illustration of various components, any or all of which may be utilized as appropriate. FIG. 7, therefore, broadly illustrates how individual system elements may be implemented in a relatively separated or relatively more integrated manner.

The computer system 700 is shown comprising hardware elements that can be electrically coupled via a bus 705 (or may otherwise be in communication, as appropriate). The hardware elements may include one or more processors 710, including without limitation one or more general-purpose processors and/or one or more special-purpose processors (such as digital signal processing chips, graphics acceleration processors, and/or the like); one or more input devices 715, which can include without limitation a mouse, a keyboard, and/or the like; and one or more output devices 720, which can include without limitation a display device, a printer, and/or the like.

The computer system 700 may further include (and/or be in communication with) one or more non-transitory storage devices 725, which can comprise, without limitation, local and/or network accessible storage, and/or can include, without limitation, a disk drive, a drive array, an optical storage device, a solid-state storage device, such as a random access memory ("RAM"), and/or a read-only memory ("ROM"), which can be programmable, flash-updateable and/or the like. Such storage devices may be configured to implement any appropriate data stores, including without limitation, various file systems, database structures, and/or the like.

The computer system 700 might also include a communications subsystem 730, which can include without limitation a modem, a network card (wireless or wired), an infrared communication device, a wireless communication device, and/or a chipset (such as a Bluetooth™ device, an 802.11 device, a WiFi device, a WiMax device, cellular communication facilities, etc.), and/or the like. The communications subsystem 730 may permit data to be exchanged with a network (such as the network described below, to name one example), other computer systems, and/or any other devices described herein. In many embodiments, the computer system 700 will further comprise a working memory 735, which can include a RAM and/or ROM device(s), as described above.

The computer system 700 also can comprise software elements, shown as being currently located within the working memory 735, including an operating system 740, device drivers, executable libraries, and/or other code, such as one or more application programs 745, which may comprise computer programs provided by various embodiments, and/or may be designed to implement methods, and/or configure systems, provided by other embodiments, as described herein. Merely by way of example, one or more procedures described with respect to the method(s) discussed above might be implemented as code and/or instructions executable by a computer (and/or a processor within a computer); in an aspect, then, such code and/or instructions can be used to configure and/or adapt a general purpose computer (or other device) to perform one or more operations in accordance with the described methods.

A set of these instructions and/or code might be stored on a non-transitory computer-readable storage medium, such as the non-transitory storage device(s) 725 described above. In some cases, the storage medium might be incorporated within a computer system, such as computer system 700. In other embodiments, the storage medium might be separate from a computer system (e.g., a removable medium, such as a compact disc), and/or provided in an installation package, such that the storage medium can be used to program, configure, and/or adapt a general purpose computer with the instructions/code stored thereon. These instructions might take the form of executable code, which is executable by the computer system 700 and/or might take the form of source and/or installable code, which, upon compilation and/or installation on the computer system 700 (e.g., using any of a variety of generally available compilers, installation programs, compression/decompression utilities, etc.), then takes the form of executable code.

It will be apparent to those skilled in the art that substantial variations may be made in accordance with specific requirements. For example, customized hardware might also be used, and/or particular elements might be implemented in hardware, software (including portable software, such as applets, etc.), or both. Further, connection to other computing devices such as network input/output devices may be employed.

As mentioned above, in one aspect, some embodiments may employ a computer system (such as the computer system 700) to perform methods in accordance with various embodiments of the invention. According to a set of embodiments, some or all of the procedures of such methods are performed by the computer system 700 in response to processor 710 executing one or more sequences of one or more instructions (which might be incorporated into the operating system 740 and/or other code, such as an application program 745) contained in the working memory 735. Such instructions may be read into the working memory 735 from another computer-readable medium, such as one or more of the non-transitory storage device(s) 725. Merely by way of example, execution of the sequences of instructions contained in the working memory 735 might cause the processor(s) 710 to perform one or more procedures of the methods described herein.

The terms "machine-readable medium" and "computer-readable medium," as used herein, refer to any medium that participates in providing data that causes a machine to operate in a specific fashion. In an embodiment implemented using the computer system 700, various computer-readable media might be involved in providing instructions/code to processor(s) 710 for execution and/or might be used to store and/or carry such instructions/code. In many implementations, a computer-readable medium is a physical and/or tangible storage medium. Such a medium may take the form of a non-volatile media or volatile media. Non-volatile media include, for example, optical and/or magnetic disks, such as the non-transitory storage device(s) 725. Volatile media include, without limitation, dynamic memory, such as the working memory 735.

Common forms of physical and/or tangible computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, EPROM, a FLASH-EPROM, any other memory chip or cartridge, or any other medium from which a computer can read instructions and/or code.

Various forms of computer-readable media may be involved in carrying one or more sequences of one or more instructions to the processor(s) 710 for execution. Merely by way of example, the instructions may initially be carried on a magnetic disk and/or optical disc of a remote computer. A remote computer might load the instructions into its dynamic memory and send the instructions as signals over a transmission medium to be received and/or executed by the computer system 700.

The communications subsystem 730 (and/or components thereof) generally will receive signals, and the bus 705 then might carry the signals (and/or the data, instructions, etc. carried by the signals) to the working memory 735, from which the processor(s) 710 retrieves and executes the instructions. The instructions received by the working memory 735 may optionally be stored on a non-transitory storage device 725 either before or after execution by the processor(s) 710.

The methods, systems, and devices discussed above are examples. Various configurations may omit, substitute, or add various procedures or components as appropriate. For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Also, configurations may be described as a process which is depicted as a flow diagram or block diagram. Although each may describe the operations as a sequential process, many of the operations can be performed in parallel or concurrently. In addition, the order of the operations may be rearranged. A process may have additional steps not included in the figure. Furthermore, examples of the methods may be implemented by hardware, software, firmware, middleware, microcode, hardware description languages, or any combination thereof. When implemented in software, firmware, middleware, or microcode, the program code or code segments to perform the necessary tasks may be stored in a non-transitory computer-readable medium such as a storage medium. Processors may perform the described tasks.

It should be understood, that in addition to the preceding being embodiments of the invention being applied to set top boxes and remote controls, other forms of computerized hardware may be used, such as a computer and a set top box for communication with a thermostat (instead of a remote control) and a light dimmer switch. Other examples applicable to the systems and methods discussed herein are also possible. For example, two computerized devices may use a communication controller for deliberate collision triggering.

Having described several example configurations, various modifications, alternative constructions, and equivalents may be used without departing from the spirit of the disclosure. For example, the above elements may be components of a larger system, wherein other rules may take precedence over or otherwise modify the application of the invention. Also, a number of steps may be undertaken before, during, or after the above elements are considered. Accordingly, the above description does not bound the scope of the claims.

What is claimed is:

1. A communication control system, comprising:
   a television receiver communication module, communicatively coupled with a plurality of television receivers, configured to receive a remote control data transmission from a television receiver of the plurality of television receivers, wherein the remote control data transmission is to be transmitted to at least one remote control;
   a first amplifier configured to receive the remote control data transmission from the television receiver communication module and amplify the remote control data transmission, wherein:
   the remote control data transmission is amplified by the first amplifier on a remote control communication channel of a plurality of remote control communication channels on which the remote control data transmission is received; and
   the first amplifier is configured to output the amplified remote control data transmission to one or more antennas; and
   a jamming module configured to transmit a jamming signal to the plurality of television receivers while the television receiver communication module is receiving the remote control data transmission from the television receiver of the plurality of television receivers; wherein the communication control system is distinct from the plurality of television receivers.

2. The communication control system of claim 1, wherein the jamming module is configured to transmit the jamming signal on each remote control communication channel of the plurality of remote control communication channels to the plurality of television receivers.

3. The communication control system of claim 1, wherein the jamming module is configured to transmit the jamming signal on each remote control communication channel of the plurality of remote control communication channels to the plurality of television receivers other than the remote control communication channel on which the remote control data transmission is received by the television receiver communication module.

4. The communication control system of claim 3, wherein the jamming signal is configured to continue being transmitted for a period of time after the remote control data transmission has been transmitted, wherein the period of time is based upon a time duration of the remote control data transmission.

5. The communication control system of claim 1, further comprising a second amplifier configured to amplify a data transmission received by the television receiver communication module from the at least one remote control, wherein the amplified data transmission is output to the plurality of television receivers.

6. The communication control system of claim 5, wherein the first amplifier is a power amplifier and the second amplifier is a low noise amplifier.

7. The communication control system of claim 1, further comprising splitter configured to electrically couple the television receiver communication module with the plurality of television receivers.

8. The communication control system of claim 1, further comprising:
an antenna communication module configured to receive and output the amplified remote control data transmissions; and
a plurality of antennas, wherein the plurality of antennas are configured to be electrically coupled with the antenna communication module.

9. The communication control system of claim 1, wherein the jamming module comprises a frequency modulator module, wherein the frequency modulator module is configured to output jamming signals across multiple remote control communication channels of the plurality of remote control communication channels simultaneously, wherein the jamming signals are based on the remote control data transmission and vary in frequency.

10. The communication control system of claim 1, wherein the remote control data transmission is selected from the group consisting of:
a television receiver status message,
an IR control table update,
a DVR timer setting,
a remote control firmware update,
a remote control interface configuration message,
a networking message;
a prior message receipt status; and
a message for presentation to a user.

11. A communication control apparatus, comprising:
a module, communicatively coupled with a first plurality of computerized devices, for receiving a data transmission from a computerized device of the first plurality of computerized devices, wherein
the data transmission is to be transmitted to at least one computerized device of a second plurality of computerized devices;
a module for amplifying the data transmission, wherein:
the data transmission is amplified by the module for amplifying on a communication channel of a plurality of communication channels on which the data transmission was received; and
a module for jamming configured to transmit a jamming signal to the first plurality of computerized devices while the module for receiving the data transmission is receiving the data transmission from the computerized device of the first plurality of computerized devices, wherein the communication control apparatus is distinct from the first plurality of computerized devices and the second plurality of computerized devices.

12. The communication control apparatus of claim 11, wherein the module for jamming is configured to transmit the jamming signal on each communication channel of the plurality of communication channels to the first plurality of computerized devices.

13. The communication control apparatus of claim 11, wherein the module for jamming is configured to transmit the jamming signal on each communication channel of the plurality of communication channels to the first plurality of computerized devices other than the communication channel on which the data transmission is received by the module for receiving.

14. The communication control apparatus of claim 13, wherein the module for jamming is configured to continue to transmit the jamming signal for a period of time after data transmission has been transmitted.

15. The communication control apparatus of claim 11, further comprising:
a second module for amplifying configured to amplify a second data transmission received by the communication control apparatus from a second computerized device the second plurality of computerized devices, wherein the amplified second data transmission is output to the first plurality of computerized devices.

16. The communication control apparatus of claim 11, further comprising a module for splitting configured to electrically couple the module for receiving with the first plurality of computerized devices.

17. The communication control apparatus of claim 11, further comprising:
a module for transmitting the amplified data transmission; and
a module for radiating configured to be electrically coupled with the module for transmitting and configured to wirelessly radiate the amplified data transmission.

18. The communication control apparatus of claim 11, wherein the module for jamming comprises:
a module for frequency modulation configured to output jamming signals across multiple communication channels of the plurality of communication channels simultaneously, wherein
the jamming signals are based on the data transmission and vary in frequency.

19. A method for jamming communication, comprising:
receiving, by a communication control system, a remote control data transmission from a television receiver of a plurality of television receivers, wherein:
the remote control data transmission is to be transmitted to at least one remote control; and
the communication control system is communicatively coupled with the plurality of television receivers;
amplifying the remote control data transmission on a remote control communication channel of a plurality of remote control communication channels, wherein:
the remote control data transmission is amplified on the remote control communication channel of the plurality of remote control communication channels on which the remote control data transmission was received;
outputting the amplified remote control data transmission to one or more antennas; and
transmitting a jamming signal to the plurality of television receivers while the remote control data transmission is being received from the television receiver of the plurality of television receivers, wherein the communication control system is distinct from the plurality of television receivers.

20. The method for jamming communication of claim 19, wherein transmitting the jamming signal comprises transmitting the jamming signal on each remote control communication channel of the plurality of remote control communication channels to the plurality of television receivers.

* * * * *